Dec. 23, 1969 W. DOESSCHATE, JR 3,486,120

CROSS MODULATION REJECTION SYSTEM

Filed Nov. 17, 1966 2 Sheets-Sheet 1

% CROSS MODULATION VS. Ie
WITH & WITHOUT AUDIO COMPENSATION
eu = 50MV, ed = 75µv, Vce = 6V

INVENTOR.
WALTER DOESSCHATE, JR.
BY
AGENT

INVENTOR.
WALTER DOESSCHATE, JR.
BY
AGENT

United States Patent Office 3,486,120

Patented Dec. 23, 1969

3,486,120

CROSS MODULATION REJECTION SYSTEM

Walter Doesschate, Jr., Woonsocket, R.I., assignor to U.S. Philips Company, Inc., New York, N.Y., a corporation of Delaware Filed Nov. 17, 1966, Ser. No. 595,260

Int. Cl. H04b *1/10*

U.S. Cl. 325—472 5 Claims

ABSTRACT OF THE DISCLOSURE

This disclosure describes a transistorized radio frequency stage amplifier having an audio frequency responsive impedance such as an audio amplifier connected to the radio frequency stage transistor amplifier so as to form a cross modulation compensation network.

Figure 1:
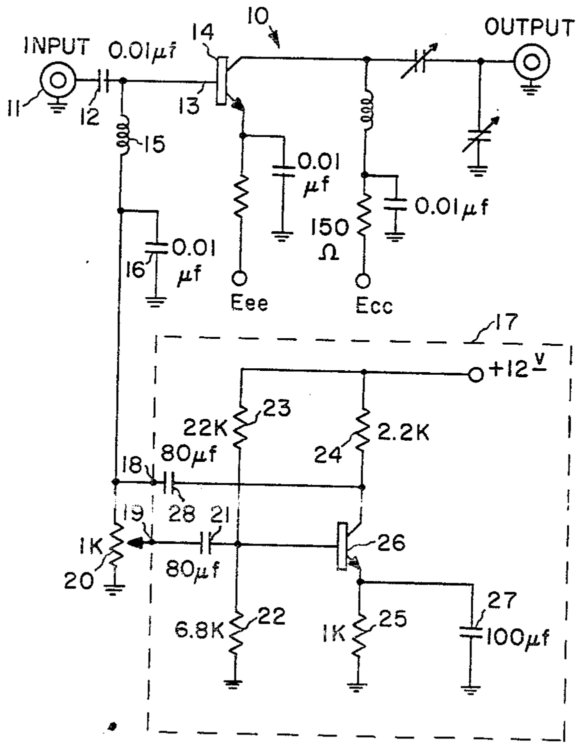

The present invention relates to cross modulation rejection and particularly to a system for improving the cross modulation properties of amplitude modulated radio frequency amplifiers.

In communication, radar, navigation and the more recent forms of color television receivers, the undesirable phenomenon of amplitude cross modulation has become increasingly important. The advent of transistorized circuitry has placed even further emphasis on the deleterious effects of cross modulation due to the inherently poorer cross modulation rejection characteristics of transistors as compared with vacuum tubes.

Cross-talk or cross modulation is normally of two varieties. The first is produced by heterodyne detection of two signals having a frequency difference lying within the tuning range of the receiver and can be almost entirely suppressed by proper use of tuned circuits between the antenna and radio frequency amplifier stage of the receiver. The second and more troublesome variety results when a strong undesired signal is being generated at a frequency not far removed from that of the desired frequency. Cross modulation then occurs as a result of the undesired signal modulating the carrier wave of the desired signal. Because the frequency of the undesired and desired signals are not greatly diverse, elimination of the cross modulation becomes increasingly difficult.

To provide a meaningful frame of reference, cross modulation as a factor is expressed as a percentage or relative measure of the degree to which the undesired signal imposes itself upon the desired signal for any given system of detection and amplification. As a corollary, cross modulation rejection as a factor is expressed as a percentage or relative measure of the degree to which the given system is able to rid the desired signal of the undesired signal.

Vacuum tubes and semiconductors possess a degree of cross modulation rejection capability; however this is generally insufficient under serious cross modulation conditions. In improving the cross modulation rejection factor it has been the practice to employ certain selective arrangements such as tuning or switching circuits connected between the antenna and radio-frequency stages. These arrangements are necesarily elaborate and become even more so under increasingly severe conditions of cross modulation. In transistorized circuitry, as opposed to vacuum tube circuitry, the arrangements are further complicated because the inherent cross modulation rejection characteristic of the semiconductor itself will very unevenly with changes in the amplifier biasing voltages.

It is accordingly a prime object of this invention to provide a radio frequency amplification stage with improved cross modulation rejection characteristics.

It is another object of this invention to provide a transistorized radio frequency amplifier stage having improved cross modulation rejection characteristics over a wide range of amplifier bias voltage conditions.

It is a still further object of this invention to provide an arrangement for improving the cross modulation rejection characteristics of a radio frequency amplification stage which is relatively simple and inexpensive in construction and operation.

In accordance with the foregoing objects, the present invention provides an arrangement for use in conjunction with an R.F. amplifier. Prior to the present invention, relatively large variations of cross modulation rejection factors with regard to bias voltage changes in semiconductor amplifier stages have not been adequately explained. The present invention involves the discovery and recognition of a signal component heretofore not considered significant in cross modulation rejection theory, and a circuit arrangement for effectively implementing this recognition. Specificaly, it has been discovered that the detected audio component of the undesired signal can significantly affect the cross modulation rejection factor over normal bias voltage ranges of a transistorized radio frequency amplification stage, and that through the use of audio circuit techniques, a high cross modulation rejection characteristic can be achieved under severe cross modulation conditions.

A typical cross modulation situation results when an amplitude modulated receiver is operated under signal conditions which produce a strong undesired signal. The radio frequency amplifier stage is then driven toward its cut-off region and is thus operated in the non-linear portion of the amplifying device gain characteristic. The nonlienar operation of the radio frequency amplifier stage results in the cross modulation phenomena.

In the transistorized circuit, the base emitter diode non-linearity of the radio frequency stage separates the input signal into several components. Of major interest are the radio frequency carrier component, a modulated radio frequency carrier component, and an audio frequency component. The audio frequency component is composed primarily of the modulation information originally carried by the undesired signal because the undesired signal magnitude is much greater than the desired signal. The undesired signal, represented by the audio frequency component, then modulates the D.C. component of the R.F. stage transistor emitter current and, acting on the non-linearity of the forward current transfer characteristic of the transistor, or alpha characteristic, remodulates the radio frequency components of the emitter current to result in a signal having the undesired cross modulation component. To compensate for the undesired audio component, an audio frequency responsive impedance, such as an audio amplifier, is connected to the radio frequency stage transistor. The control signal presented to the radio frequency amplifier is a feedback component of the undesired modulation and is derived from the radio frequency stage itself. The resulting negative compensatory feedback results in a high degree of cross modulation rejection.

Figure 2:
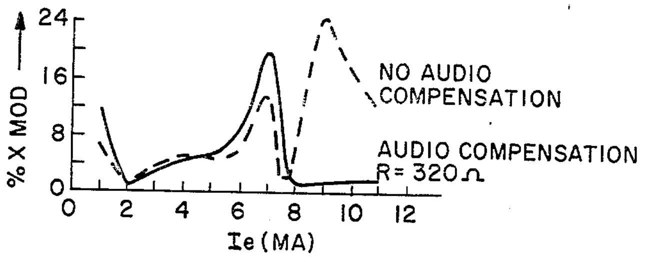
Figure 3:
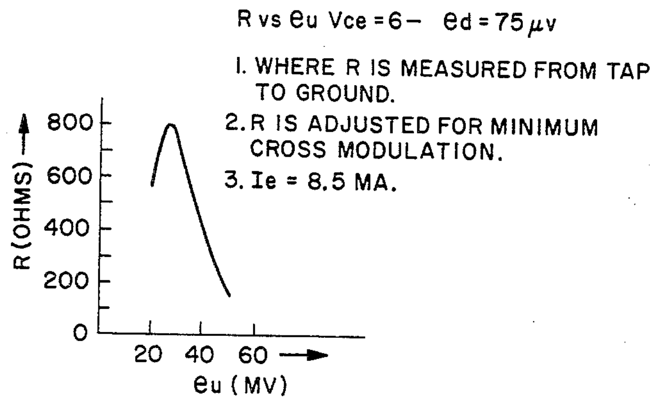
Figure 4:
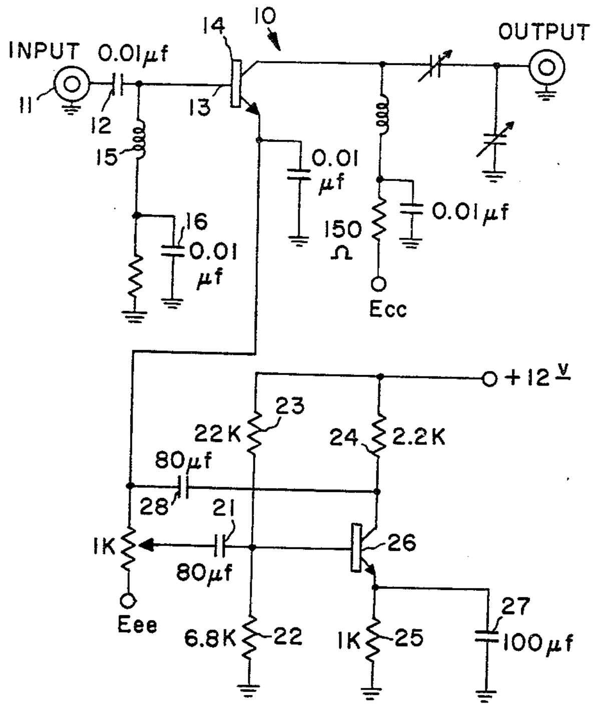

The foregoing objects and features, as well as further objects and features, will become more apparent from the following description taken in conjunction with the accompanying drawings wherein FIG. 1 illustrates an application of the present invention for cross modulation rejection in a forward current automatic gain control arrangement; FIGS. 2 and 3 graphically illustrate voltage and current relationships created by the present invention; FIG. 4 illustrates the corollary of FIG. 1 for cross modulation rejection in a reverse current automatic gain control arrangement.

Referring to the figures, wherein like reference numerals designate like components, a radio frequency amplifier stage 10 is provided with a signal input terminal 11 connected by an input coupling capacitor 12 to the base electrode 13 of a transistor 14 connected as an amplifier in a common emitter configuration. The remaining radio frequency stage components are standard and will not be described further, other than as illustrated in the figures, wherein I*e* signifies emitter current, E*ee* the bias applied to the emitter of transistor 14 and E*cc* the bias applied to the collector of transistor 14. A choke 15 and a radio frequency bypass capacitor 16 couple the audio frequency component of the radio frequency input signal to an audio amplifier 17 having an input point 18 and an output point 19 which is returned to the radio frequency amplifier stage input by means of a pre-set potentiometer 20. The audio amplifier 17 is shown includes an output coupling capacitor 21, a D.C. biasing network consisting of a plurality of resistors 22, 23, 24 and 25, a transistor 26 connected in a common emitter configuration, a bypass capacitor 27, and an input coupling capacitor 28.

In operation, a relatively large component of undesired signal cross modulated on the R.F. carrier of a desired signal will be detected across the base-emitter diode of transistor 14. The audio component of the undesired signal will be separated by the filtering network consisting of the choke 15 and the capacitor 16 and thereafter conducted to the impedance network consisting of the potentiometer 20 and the audio amplifier 17. Together, these latter two elements form an impedance network having a net impedance characteristic which will vary almost proportionately with the amount of undesired audio component. The net effect will be compensatory. In other words, the variation in the impedance network will act on the D.C. emitter current of transistor 14 in derogation to the remodulation effect which was in turn caused by an uncompensated shift of D.C. emitter current on the non-linear alpha characteristic due to the undesired audio component introduced at the base electrode 13. Thus the cross modulation is reduced by a significant degree.

FIGURE 2 illustrates the percentage of cross modulation with and without audio compensation as a function of the emitter current of transistor 14. In the figures, the desired signal is $e_d$ and the undesired signal $e_u$.

The setting of the potentiometer 20 has a critical effect on the cross modulation characteristic. For an optimum cross modulation rejection characteristic over a prescribed current range, the setting will depend on the relative strength of the undesired signal. FIGURE 3 illustrates graphically the variation of the potentiometer setting R with regard to the relative strength of undesired signal.

For illustrative purposes only, values have been assigned to the various components where of interest. The transistors employed may each be of any type suitable for radio frequency and audio amplification, respectively.

It is understood that although the compensatory network is here shown as connected to the base electrode, it can easily within the scope of the present invention be provided in the emitter or collector circuits of the radio frequency stage transistor. When the radio frequency stage transistor is biased so as to have a forward gain control characteristic, that is, when an increase in collector current results in a decrease in gain, the base compensation arrangement of FIG. 1 has been found to be preferable. When the radio frequency stage transistor is biased so as to have a reverse gain control characteristic, that is, when an increase in collector current results in an increase in gain, the emitter compensation arrangement of FIG. 4 has been found to be preferable. The operation of FIG. 4 is similar to that of FIG. 1.

What is claimed is:

1. A cross modulation rejection system for a radio frequency amplifier comprising a stage of radio frequency amplification having a linear region and a nonlinear region, biasing means biasing said stage in its linear region, means applying a radio frequency carrier having a desired component and an undesired component, said undesired component having a magnitude sufficient to drive said stage toward a nonlinear region thereof, means responsive to said radio frequency carrier for detecting the audio frequency portion of said undesired component, impedance means responsive to the variation in said detected audio frequency portion for producing a corresponding impedance variation in said impedance means, and means for feeding back said impedance variation to said stage of radio frequency amplification for compensating said undesired component and maintaining said stage in said linear region.

2. The combination of claim 1 wherein said radio frequency amplification stage includes a transistor and said means for separating the undesired audio frequency component from said carrier comprises the base-emitter diode junction of said transistor.

3. The combination of claim 1 wherein said audio frequency responsive impedance includes a transistor connected in a common emitter configuration, first capacitive means coupling said audio frequency component from said radio frequency stage to the input of said transistor, and second capacitive means returning an audio frequency compensation signal from said audio frequency stage to said radio frequency stage.

4. A cross modulation rejection system comprising a radio frequency amplifier stage employing at least one transistor having an operating region of linear and nonlinear portions and emitter, base and collector electrodes, biasing means connected to said radio frequency amplifier stage for biasing said transistor in said linear portion thereof, means applying an input signal to said transistor, said input signal including a carrier, a desired signal and an undesired signal, said undesired signal having sufficient strength to shift the current flow through said emitter and thereby to drive said transistor into said nonlinear portion thereof and thereby increase cross modulation between said desired and undesired signal, means for detecting said undesired signal across the emitter base diode of said transistor, filtering means coupled to said emitter base diode of said transistor for filtering out the audio frequency component of said undesired signal, variable impedance means, means applying said audio frequency component of said undesired signal to said variable impedance means, said variable impedance means varying impedance in accordance with the amount of undesired audio component applied thereto, means coupling said impedance means to said biasing means, said impedance means variation thereby acting to compensate for said emitter current shift and to maintain said transistor in said linear operating region.

5. The combination of claim 4 wherein said variable impedance means is an audio amplifier having an input and output terminated across a common resistance, and wherein said means applying said audio frequency component of said undesired signal is connected to said common resistance.

References Cited

UNITED STATES PATENTS 3,275,939 9/1966 Luftig ______________ 325—472

RICHARD MURRAY, Primary Examiner

J. A. BRODSKY, Assistant Examiner

U.S. Cl. X.R.

325—413, 473